US012001235B2

(12) United States Patent
Mei

(10) Patent No.: US 12,001,235 B2
(45) Date of Patent: Jun. 4, 2024

(54) STARTUP CIRCUIT FOR HIGH VOLTAGE LOW POWER VOLTAGE REGULATOR

(71) Applicant: Texas Instruments Incorporated, Dallas, TX (US)

(72) Inventor: Tawen Mei, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 259 days.

(21) Appl. No.: 17/708,278

(22) Filed: Mar. 30, 2022

(65) Prior Publication Data

US 2023/0315139 A1 Oct. 5, 2023

(51) Int. Cl.
*G05F 3/02* (2006.01)
*G05F 3/30* (2006.01)

(52) U.S. Cl.
CPC .................................... *G05F 3/30* (2013.01)

(58) Field of Classification Search
CPC ................ G05F 3/30; G05F 3/02; G05F 3/08
See application file for complete search history.

(56) References Cited

U.S. PATENT DOCUMENTS 6,815,941 B2 11/2004 Butler
6,891,358 B2 5/2005 Marinca
7,342,390 B2 3/2008 Tachibana et al.
7,430,131 B2 9/2008 Grasso et al.
7,705,575 B2 4/2010 Akyildiz et al.
9,594,391 B2 3/2017 De Cremoux
10,942,536 B1 * 3/2021 Hassan .................. G05F 1/563
11,409,350 B1 * 8/2022 Krishnamurthy ..... G06F 1/3206
2008/0157746 A1 7/2008 Chen
2021/0257902 A1 * 8/2021 Chang ..................... H02M 1/32
2023/0130733 A1 * 4/2023 Zhang ....................... G05F 3/26
323/274

* cited by examiner

*Primary Examiner* — Adolf D Berhane

(74) *Attorney, Agent, or Firm* — Ray A. King; Frank D. Cimino

(57) ABSTRACT

Described embodiments include a circuit for voltage regulator startup. The circuit includes a voltage regulation circuit having first and second regulator inputs and a regulator output. A startup circuit has a startup input coupled to the first regulator input, and a startup output. A reference generation circuit has first and second reference inputs and first and second reference outputs. The first reference input is coupled to the regulator output. The second reference input is coupled to the startup output, and the first reference output is coupled to a reference output terminal and to the second regulator input. A reference detection circuit has a first detection input coupled to the regulator output, and a second detection input coupled to the second reference output, and provides a reference ready signal responsive to a reference voltage being within a reference specification.

20 Claims, 2 Drawing Sheets

STARTUP CIRCUIT FOR HIGH VOLTAGE LOW POWER VOLTAGE REGULATOR

BACKGROUND

This description relates to voltage regulators, and to a startup circuit for high-voltage low-power voltage regulators. Switching regulators typically include an internal regulated supply voltage source and a reference voltage and/or current source. Maximum power consumption is a parameter often specified in integrated circuits. Portable and battery-powered systems typically specify a low power consumption. The maximum size of the circuit or packaging is another parameter that is typically specified in portable and battery-powered systems.

Reference voltage generator circuits are specified to provide a stable and accurate reference voltage over a wide variation in operating temperatures. However, problems can occur with reference generator circuits during circuit startup. A fast rise time in the power supply input voltage will generally result in a reliable circuit startup. However, reference circuit startup may not occur if the power supply input voltage increases too slowly. Furthermore, even if the circuit initially starts up properly, if the power supply input voltage drops below a threshold, the circuit may shut down. Following such a shutdown, the circuit may not restart properly after the power supply input voltage is restored to a proper value.

SUMMARY

In a first example, a circuit for voltage regulator startup includes a voltage regulation circuit having first and second regulator inputs and a regulator output. The first regulator input is coupled to an input voltage terminal. A startup circuit has a startup input and a startup output. The startup input is coupled to the input voltage terminal.

A reference generation circuit has first and second reference inputs and first and second reference outputs. The first reference input is coupled to the regulator output. The second reference input is coupled to the startup output. The first reference output is coupled to a reference output terminal and to the second regulator input.

A reference detection circuit has first and second detection inputs and a detection output. The first detection input is coupled to the regulator output, and the second detection input is coupled to the second reference output. The reference detection circuit is configured to provide a reference ready signal at the reference output responsive to a voltage at the reference output being within a reference specification.

In a second example, a voltage regulator circuit includes a first resistor having first and second resistor terminals. A first transistor is coupled between an input voltage terminal and the first resistor terminal, and the first transistor has a first control terminal. A second resistor is coupled between the second resistor terminal and the first control terminal. A second transistor is coupled between the input voltage terminal and a regulator output, and the second transistor has a second control terminal that is coupled to the second resistor terminal.

A third transistor has a current terminal coupled to the second resistor terminal, and has a third control terminal that is coupled to a reference voltage terminal. A fourth transistor is coupled between the third transistor and a ground terminal, and has a fourth control terminal that is coupled to the third transistor. A fifth transistor is coupled between the fourth resistor terminal and the ground terminal, and has a fifth control terminal.

DETAILED DESCRIPTION

In this description, the same reference numbers depict same or similar (by function and/or structure) features. The drawings are not necessarily drawn to scale.

Some integrated circuits have a high voltage main power supply input, but have internal circuits that operate at a voltage that is lower than the high voltage input supply. This requires an internal supply voltage regulator to regulate the main supply voltage down to a voltage that is safe for the internal circuits. A typical internal supply voltage regulator includes a reference generation circuit to provide an accurate reference voltage or current. The internal supply voltage regulator may include a means for determining when the reference voltage is within specification following circuit startup. Many systems include specifications that requires the internal supply voltage regulator to perform these functions while operating in a small area and consuming a low amount of power.

Some internal voltage regulators use an always-on Zener diode as a reference to start up the regulator, which then powers up a startup circuit for the bandgap reference. A separate bandgap reference detection circuit monitors the bandgap reference voltage to determine when it has reached a specified voltage. The drawbacks to this approach include that the power consumption of the circuit is relatively high and the circuit occupies a relatively large silicon area.

Figure 1:
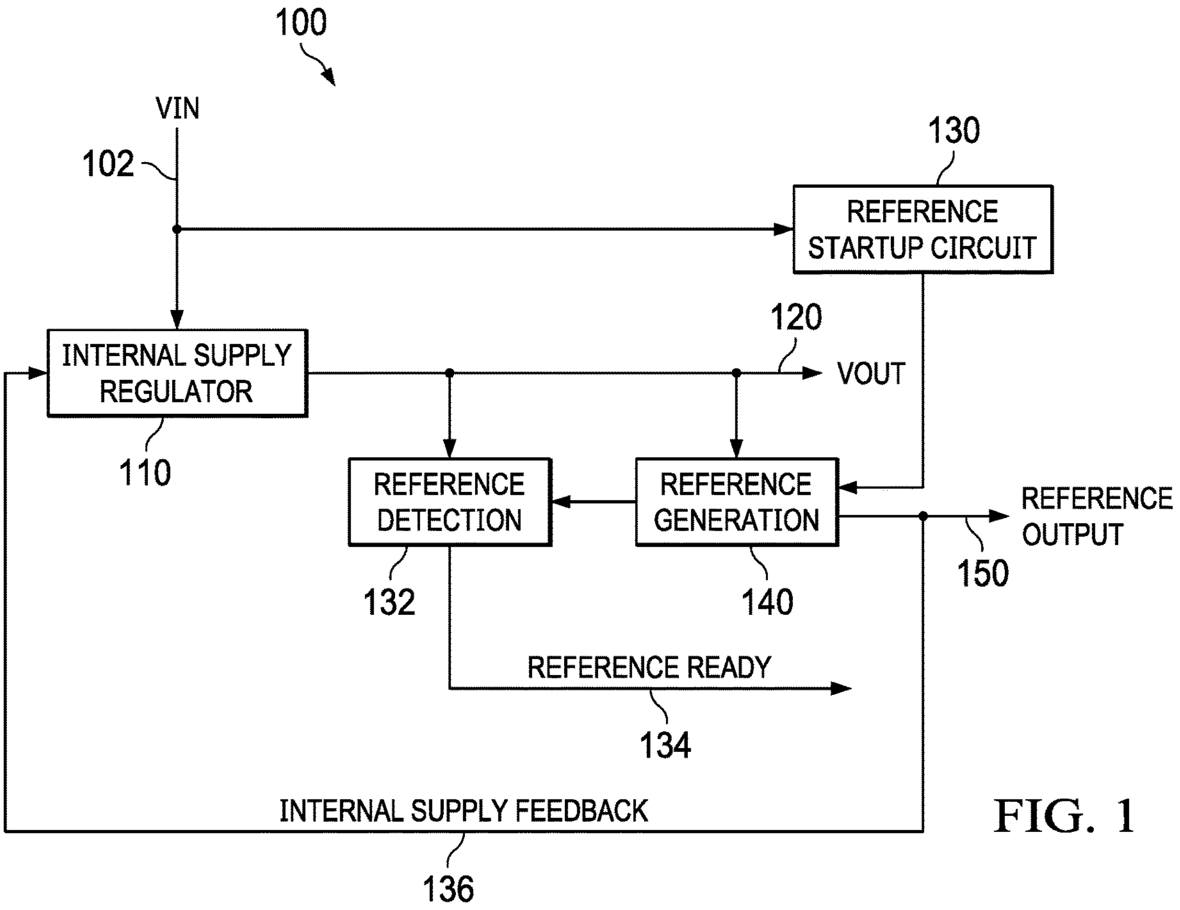
FIG. 1 shows a schematic diagram of an example voltage regulator having a startup circuit that provides an indication that a bandgap reference voltage is within a specification.

FIG. 1 shows a block diagram for a voltage regulator startup circuit 100 that provides an indication that a bandgap reference voltage is within a specification. The circuit includes a self-starting internal supply voltage regulator that is controlled by the bandgap reference and supplies power to other circuits. The circuit further includes a bandgap reference detector that monitors a bandgap reference voltage and provides a signal indicating that the bandgap reference voltage is within a specified range.

An internal supply voltage regulator 110 has a first input coupled to an input voltage terminal VIN 102, and a second input coupled to an internal supply feedback 136. In at least one embodiment, the internal supply feedback is a circuit coupled between an input to the internal supply voltage regulator 110 and a reference voltage output terminal 150. In another embodiment, the input to the internal supply voltage regulator 110 is coupled directly to the reference voltage output terminal 150. The internal supply voltage regulator has an output VOUT 120 supplying an internal supply output voltage. A reference startup circuit 130 has an input coupled to the input voltage terminal VIN 102, and an output coupled to an input of a reference generation circuit 140. A reference detection circuit 132 has an input coupled to the internal supply output VOUT 120, and an output that provides a Reference Ready signal 134. A reference generation circuit 140 has a first input coupled to the internal supply output VOUT 120, and a second input coupled to the reference startup circuit 130. The reference generation circuit 140 has a first output coupled to a reference output terminal 150, and a second output coupled to the reference detection circuit 132. The reference generation circuit 140 can be a bandgap reference circuit.

The internal supply regulator 110 receives power from the input voltage VIN 102. The internal supply regulator 110 receives a reference voltage from the reference output 150. The reference output 150 is a stable reference voltage that is fed back to the internal supply regulator 110 to provide closed loop feedback to regulate the voltage at the internal supply output VOUT 120. The reference output 150 is generated by the reference generation circuit 140, which receives its input supply from VOUT 120.

The reference generation circuit 140 receives power from the output VOUT 120 of the internal supply voltage regulator. The reference generation circuit 140 is coupled to the reference detection circuit 132, which monitors the reference voltage and provides a Reference Ready signal 134 when the voltage at the reference output 150 is within a specified voltage range. The reference startup circuit 130 provides a startup signal to the reference generation circuit 140 upon power up or following a reset.

Figure 2:
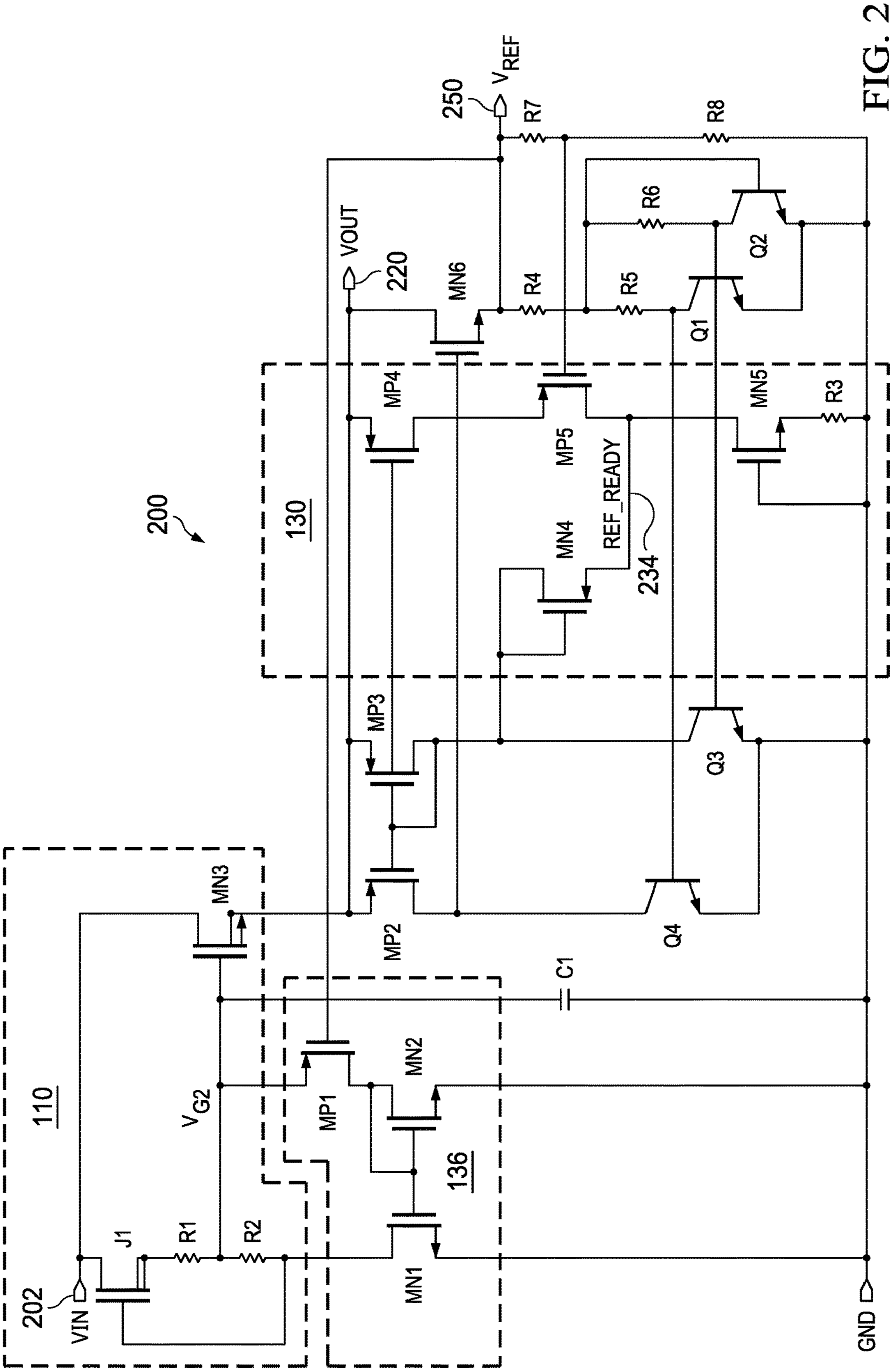
FIG. 2 shows a schematic diagram of an example voltage regulator startup circuit that provides an indication that a bandgap reference voltage is within a specification.

FIG. 2 shows a schematic diagram for an example voltage regulator startup circuit 200 that provides a reference ready signal to other circuits that a bandgap reference voltage is within a specification. The reference ready signal can be provided to other components in the system. The reference ready signal may be used that the reference voltage is not within specification, and therefore, the output of the internal supply voltage regulator is not ready to be used. In at least some systems, the response may be to remain in standby to avoid improper operation.

J1 is a junction-gate field effect transistor (JFET). The drain of J1 is coupled to an input voltage terminal VIN 202. MN3 is an n-channel metal oxide semiconductor field effect transistor (NFET). MN3 is a zero-threshold NFET that is coupled between the input voltage terminal VIN 202 and an internal supply output terminal, VOUT 220. Resistor R1 is coupled between the source of J1 and the gate of MN3. Resistor R2 is coupled between the gate of MN3 and the gate of J1.

MP1 is a p-channel metal oxide semiconductor field effect transistor (PFET). The source of MP1 is coupled to the gate of MN3, and the gate of MP1 is coupled to a reference output terminal $V_{REF}$ 250. MN1 is an NFET coupled between the gate of J1 and ground. MN2 is an NFET coupled between the drain of MP1 and ground. The gate of MN1 is coupled to the gate and the drain of MN2. A capacitor C1 is coupled between the gate of MN3 and ground.

MP2 is a PFET having a source coupled to the internal supply output terminal, VOUT 220. Q4 is a bipolar junction transistor (BJT) coupled between the drain of MP2 and ground. MP3 is a PFET having a source coupled to the internal supply output terminal, VOUT 220. Q3 is a BJT coupled between the drain of MP3 and ground. MP4 is a PFET having a source coupled to the internal supply output terminal, VOUT 220. The gate of MP4 is coupled to the gates of MP3 and of MP2.

MP5 is a PFET having a source coupled to the drain of MP4. MN4 is an NFET coupled between the drain of MP5 and the drain of MP3. The gate of MN4 is connected to the drain of MN4. MN5 is a zero-threshold NFET having a drain coupled to the drain of MP5, and having a gate connected to ground. R3 is a resistor coupled between the source of MN5 and ground. R7 is a resistor coupled between the reference output terminal $V_{REF}$ 250 and the gate of MP5. R8 is a resistor coupled between resistor R7 and ground.

MN6 is an NFET coupled between the internal supply output terminal VOUT 220 and reference output terminal $V_{REF}$ 250. The gate of MP6 is coupled to the drain of MP2. Q1 is a BJT coupled between the base of Q4 and ground. Q2 is a BJT coupled between the base of Q1 and ground. Resistor R4 is coupled between reference output terminal $V_{REF}$ 250 and the base of Q2. Resistor R5 is coupled between resistor R4 and the base of Q2.

The internal supply regulator 110 includes transistors J1 and MN3 and resistors R1 and R2. J1 is chosen to be a depletion device so that the transistor will turn on with the gate-to-source voltage at zero volts. If J1 is an enhancement device, such as a MOSFET, then holding the gate at ground would mean the source would remain stuck at ground and the circuit will not autostart. Resistors R1 and R2 form a voltage divider of the voltages between VIN 202 and the voltage at the gate of J1. The gate of MN3 is coupled to the center terminal of the voltage divider formed by R1 and R2. Transistor MN3 is a zero-threshold NFET. The internal supply regulator 110 uses J1 together with MN3 to raise the voltage at VOUT 220.

The inclusion of the voltage divider formed by R1 and R2 in the circuit allows use of a JFET with a larger pinch-off voltage than in many conventional circuits. Having a transistor (J1) with a larger pinch-off voltage allows a larger voltage at the source of J1 in the case where the voltage at the gate of J1 is zero. In conventional systems, having a larger voltage at the source of J1 could present a problem. The problem this presents is that the source of J1 cannot be used to power other circuits because the voltage at the source is too high. However, the output voltage at VOUT 220 can be controlled by including resistors R1 and R2 and transistor MN3 in circuit 200.

The resistance values of resistors R1 and R2 can be scaled to provide the proper voltage and sized to reduce current flow through the transistor, helping the additional circuitry to remain within a power specification. If the resistance values of R1 and R2 are sufficiently large, the current through transistor J1 will be negligible. If the current through transistor J1 is negligible, the current through transistors MN1 and MN2 will be negligible. Transistor MN3 carries the current needed at VOUT 220 for the rest of the circuit. The resistance values of R1 and R2 are chosen to ensure that the voltage at VOUT 220 is within its maximum voltage specification at the lowest pinch-off voltage for J1.

Internal supply feedback circuit 136 includes transistors MP1, MN1 and MN2. The internal supply feedback uses the bandgap reference output $V_{REF}$ 250 to regulate VOUT 220 to:

$$VOUT=V_{REF}+V_{gsMP1}-V_{gsMN3}$$

where $V_{gsMP1}$ is the gate-to-source voltage of MP1, and $V_{gsMN3}$ is the gate-to source voltage of MN3. MN1 replicates the current through MN2, forming a current mirror. MN1, R1 and R2 form a common source amplifier to regulate the voltage at the gate of J1. The first input to the common source amplifier is $V_{REF}$ at the gate of MP1. The second input to the common source amplifier is $V_{G2}$ at the gate of MN3. This circuit regulates the voltage at the gate of J1. If MN1 is turned on harder, the voltage at the gate of J1 will be low. If MN1 is turned off, the voltage at the gate of J1 will float higher.

Reference startup circuit 130 includes transistors MP4, MP5, MN4 and MN5, and resistor R3. MN5 is a zero-threshold FET. MN5, R3, and MN4 pull down the amplifier's internal node. This causes the bandgap reference output $V_{REF}$ 250 to be pulled up. Transistor MP4 monitors the bias current of transistor MP5. The current through MN4 is equal to the current through MP5. Current will flow through MP5 if the bandgap circuit is operating and is coming up to voltage. If MP5 has no current, then MN4 and MN5 also have no current because MP4 and MP3 form a current mirror.

The gate of MP5 is coupled to a voltage divider that is formed by resistors R7 and R8, which provides a voltage proportional to the voltage at the bandgap reference output $V_{REF}$ 250. If the voltage at VOUT 220 is below a threshold, transistor MP4 will operate in the triode region, and the voltage at the bandgap reference output $V_{REF}$ 250 will be low. If the voltage at the bandgap reference output $V_{REF}$ 250 rises high enough, transistor MP5 will operate in the triode region. If MP5 is operating in the triode region, transistor MP4 will be off, and the reference ready signal refRdy 234 will not be asserted. When the voltage at VOUT 220 is above the threshold, transistor MP4 will turn on hard, and current will flow through transistor MP5. When current flows through MP5, the reference ready signal refRdy 234 will be asserted, indicating that the reference voltage $V_{REF}$ 250 is within specification and ready for normal operation.

Figure 3:
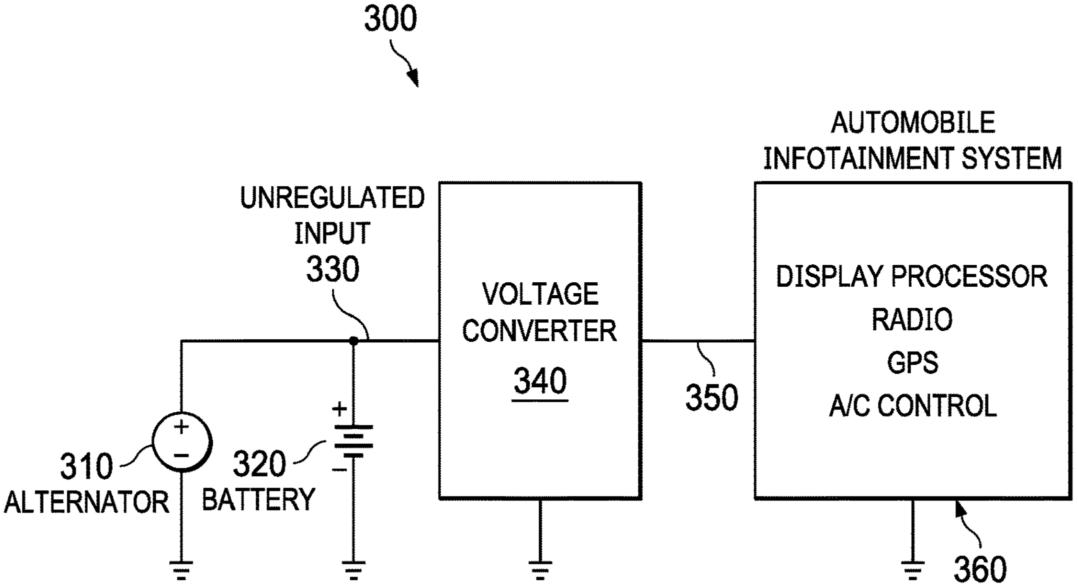
FIG. 3 shows a block diagram for an example application using a voltage regulator with a startup circuit.

FIG. 3 shows a block diagram 300 for an example application using a voltage regulator startup circuit. Typical systems that can benefit from using the voltage regulator startup circuit include automobile infotainment systems 360. Automobile infotainment systems may include display processors, radios, global positioning systems (GPS), and air conditioning controls.

A battery 320 provides a power source to provide power to the infotainment system 360. However, battery 320 provides an unregulated voltage 330, which needs to be regulated and brought to a proper voltage using voltage converter 340. Alternator 310 charges the battery 320 and provides power to the automobile electrical system. The output of alternator 310 and the output of battery 320 are coupled together and provide unregulated input 330. The input of voltage converter 340 is coupled to unregulated input 330. The output of voltage converter 340 is coupled to automobile infotainment system 360 and provides power at a specified regulated voltage to power the components of automobile infotainment system 360.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit for voltage regulator startup, the circuit comprising:

a voltage regulation circuit having first and second regulator inputs and a regulator output;

a startup circuit having a startup input and a startup output, the startup input coupled to the first regulator input;

a reference generation circuit having first and second reference inputs and first and second reference outputs, the first reference input coupled to the regulator output, the second reference input coupled to the startup output, and the first reference output coupled to a reference output terminal and to the second regulator input; and a reference detection circuit having first and second detection inputs and a detection output, the first detection input coupled to the regulator output, the second detection input coupled to the second reference output, and the reference detection circuit being configured to provide a reference ready signal at the detection output responsive to a voltage at the second detection input being within a reference specification.

2. The circuit of claim 1, further comprising an internal supply feedback circuit having a feedback input and a feedback output, the feedback input coupled to the first reference output, and the feedback output coupled to the second regulator input.

3. The circuit of claim 1, wherein the voltage regulation circuit includes:

a first resistor having first and second resistor terminals;

a first transistor coupled between the first regulator input and the first resistor terminal, and having a first control terminal;

a second resistor coupled between the second resistor terminal and the first control terminal; and a second transistor coupled between the first regulator input and the regulator output, and having a second control terminal coupled to the second resistor terminal.

4. The circuit of claim 3, wherein the first transistor is a junction-gate field effect transistor (JFET).

5. The circuit of claim 4, wherein the second transistor is a zero-threshold field effect transistor (FET).

6. The circuit of claim 2, wherein the internal supply feedback circuit includes:

a first transistor having a first control terminal coupled to the reference output terminal;

a second transistor coupled between the first transistor and a ground terminal, and having a second control terminal coupled to the first transistor; and a third transistor coupled to the ground terminal, and having a third control terminal coupled to the second control terminal.

7. The circuit of claim 1, wherein the reference generation circuit includes a bandgap reference circuit.

8. The circuit of claim 1, wherein the startup circuit includes:

a first transistor having first and second current terminals and a first control terminal, the first current terminal coupled to the regulator output;

a second transistor having third and fourth current terminals and a second control terminal, the third current terminal coupled to the second current terminal, and the second control terminal coupled to a terminal providing a signal proportional to a voltage at the regulator output;

a third transistor coupled between the fourth current terminal and a ground terminal, and having a third control terminal; and a fourth transistor having fifth and sixth current terminals and a fourth control terminal, the fifth current terminal coupled to the fourth current terminal, and the sixth current terminal coupled to the fourth control terminal.

9. The circuit of claim 8, further including:

a fifth transistor coupled between the regulator output and the sixth current terminal, and having a fifth control terminal;

a sixth transistor coupled between the fifth transistor and the ground terminal, and having a sixth control terminal;

a seventh transistor having seventh and eighth current terminals and a seventh control terminal, the seventh current terminal coupled to the regulator output, and the seventh control terminal coupled to the fifth control terminal; and an eighth transistor coupled between the eighth current terminal and the ground terminal.

10. The circuit of claim 8, wherein the third transistor is a zero-threshold FET.

11. The circuit of claim 8, further including:

a first resistor coupled between the reference output terminal and the second control terminal; and a second resistor coupled between the first resistor and the second control terminal.

12. A voltage regulator circuit, comprising:

a first resistor having first and second resistor terminals;

a first transistor coupled between an input voltage terminal and the first resistor terminal, and having a first control terminal;

a second resistor coupled between the second resistor terminal and the first control terminal;

a second transistor coupled between the input voltage terminal and a regulator output, and having a second control terminal coupled to the second resistor terminal;

a third transistor coupled to the second resistor terminal, and having a third control terminal coupled to a reference voltage terminal;

a fourth transistor coupled between the third transistor and a ground terminal, and having a fourth control terminal coupled to the third transistor; and a fifth transistor coupled between the second resistor and the ground terminal, and having a fifth control terminal.

13. The voltage regulator circuit of claim 12, wherein the first transistor is a junction-gate field effect transistor (JFET).

14. The voltage regulator circuit of claim 13, wherein the second transistor is a zero-threshold field effect transistor (FET).

15. The voltage regulator circuit of claim 12, further comprising:

a sixth transistor coupled to the regulator output, and having a sixth control terminal;

a seventh transistor coupled to the sixth transistor, and having a seventh control terminal coupled to a terminal providing a signal proportional to a voltage at the regulator output;

an eighth transistor coupled between the seventh transistor and the ground terminal; and a ninth transistor having a ninth control terminal, the ninth transistor coupled between the seventh transistor and the ninth control terminal.

16. The voltage regulator circuit of claim 15, wherein the eighth transistor is a zero-threshold FET.

17. The voltage regulator circuit of claim 15, further comprising:

a tenth transistor coupled to the regulator output, and having a tenth control terminal;

an eleventh transistor coupled between the regulator output and the tenth control terminal, and having an eleventh control terminal coupled to the tenth control terminal;

a twelfth transistor coupled between the tenth transistor and the ground terminal; and a thirteenth transistor coupled between the eleventh transistor and the ground terminal, and having a thirteenth control terminal.

18. The voltage regulator circuit of claim 17, wherein the tenth and eleventh transistors are p-channel FETs, and the twelfth and thirteenth transistors are bipolar junction transistors (BJTs).

19. The voltage regulator circuit of claim 17, further comprising:

a fourteenth transistor coupled between the regulator output and the reference voltage terminal, and having a fourteenth control terminal coupled to the tenth transistor;

a third resistor coupled to the fourteenth transistor;

a fourth resistor coupled between the fourteenth transistor and the seventh control terminal;

a fifteenth transistor coupled between the third resistor and the ground terminal, and having a fifteenth control terminal; and a sixteenth transistor coupled between the fifteenth control terminal and ground.

20. The voltage regulator circuit of claim 19, wherein the fifteenth and sixteenth transistors are BJTs.

* * * * *